(12) United States Patent
Zhu et al.

(10) Patent No.: US 10,295,775 B1
(45) Date of Patent: May 21, 2019

(54) FIBER OPTIC PULLING GRIP ASSEMBLY

(71) Applicant: AMPHENOL FIBER OPTIC TECHNOLOGY (SHENZHEN) CO., LTD., Shenzhen, Guangdong Province (CN)

(72) Inventors: Linghua Zhu, Shenzhen (CN); Songsheng Li, Shenzhen (CN); Xingfu Mo, Shenzhen (CN); Jinan Zhou, Shenzhen (CN); Anh Nguyen, Shenzhen (CN)

(73) Assignee: AMPHENOL FIBER OPTIC TECHNOLOGY (SHENZHEN) CO., LTD., Shenzhen, Guangdong Province (CN)

( * ) Notice: Subject to any disclaimer, the term of this patent is extended or adjusted under 35 U.S.C. 154(b) by 0 days.

(21) Appl. No.: 16/032,678

(22) Filed: Jul. 11, 2018

(30) Foreign Application Priority Data

Jan. 10, 2018 (TW) .............................. 107200410 U

(51) Int. Cl.
*G02B 6/44* (2006.01)

(52) U.S. Cl.
CPC ......... *G02B 6/4465* (2013.01); *G02B 6/4471* (2013.01); *G02B 6/4415* (2013.01)

(58) Field of Classification Search
CPC ..... H02G 1/081; G02B 6/4465; G02B 6/4471
See application file for complete search history.

(56) References Cited

U.S. PATENT DOCUMENTS

| 6,487,344 B1 * | 11/2002 | Naudin ................ G02B 6/4471 385/100 |
| 9,835,813 B1 * | 12/2017 | Zhu ..................... G02B 6/3894 |

\* cited by examiner

*Primary Examiner* — Omar R Rojas
(74) *Attorney, Agent, or Firm* — Muncy, Geissler, Olds & Lowe, P.C.

(57) ABSTRACT

A fiber optic pulling grip assembly includes a front grip unit to grip a front end of a mesh of a fiber optic cable, and a rear grip unit to grip a rear end of the mesh. The rear grip includes a sleeve member and a tubular fastener. The sleeve member has an anti-slip portion that has protrusions to increase friction between the anti-slip portion and a rear end of the mesh. The tubular fastener is sleeved around the sleeve member. A cable entry hole of the tubular fastener allows insertion of the fiber optic cable into the sleeve member. The anti-slip portion and the tubular fastener cooperate to clamp therebetween the rear end of the mesh.

5 Claims, 7 Drawing Sheets

FIBER OPTIC PULLING GRIP ASSEMBLY

CROSS-REFERENCE TO RELATED APPLICATION

This application claims priority to Taiwanese Patent Application No. 107200410, filed on Jan. 10, 2018.

FIELD

The disclosure relates to a pulling grip assembly, and more particularly to a fiber optic pulling grip assembly.

BACKGROUND

As shown in FIG. 1, a fiber optic cable 11 is inserted into an installation pipe 12. The fiber optic cable 11 includes a plurality of optical fibers 111, a plurality of plastic sleeves 112 respectively disposed around the optical fibers 111, and a mesh 113 covering the plastic sleeves 112. For installation of an optical fiber network within a building wall of a building, the installation pipe 12 is buried into the building wall for receiving the fiber optic cable 11. Because the optical fibers 111 are fragile, the plastic sleeves 112 are used to protect the optical fibers 111. During insertion of the fiber optic cable 11, abrasion is inevitable between the fiber optic cable 11 and the installation pipe 12. The mesh 113 functions to prevent the plastic sleeves 112 from being damaged due to inevitable abrasion.

However, the mesh 113 is disposed around the plastic sleeves 112 without being fixed to the plastic sleeves 112. When pulling forces are applied to the installation pipe 12 during the process of installing the fiber optic cable 11, the fiber optic cable 11 is subjected to repeated stresses that pull the fiber optic cable 11 relative to the installation pipe 12. Therefore, the mesh 113 is easily caused to slide and displace relative to the plastic sleeves 112. The displacement of the mesh 113 is liable to result in exposure of the two ends of the plastic sleeves 112 from the mesh 113. Without protection by the mesh 112, during the insertion of the fiber optic cable 11, the plastic sleeves 112 are easily worn and torn due to abrasion, leading to destruction of the optical fibers 111.

SUMMARY

Therefore, an object of the present disclosure is to provide a fiber optic pulling grip assembly that can prevent damages of a fiber optic cable caused by displacement movements of a protective mesh of the fiber optic cable during pulling and inserting steps of an installation process.

According to the present disclosure, a fiber optic pulling grip assembly is provided for a fiber optic cable that has an optical fiber unit and a mesh surrounding the optical fiber unit. The fiber optic pulling grip assembly includes a front grip unit and a rear grip unit.

The front grip unit is configured to sleeve around a front end of the fiber optic cable and to grip a front end of the mesh.

The rear grip unit is disposed rearward of the front grip unit and includes a sleeve member and a tubular fastener.

The sleeve member has a sleeve portion, a threaded portion extending integrally and frontally from the sleeve portion, an anti-slip portion extending integrally and frontally from the threaded portion, and a passage extending through the sleeve, thread and anti-slip portions. The passage is configured to allow insertion of the optical fiber unit. The threaded portion is formed with an outer thread. The anti-slip portion is configured to be sleeved by a rear end of the mesh. The anti-sip portion has an outer surface formed with a plurality of protrusions configured to increase friction between the outer surface and the mesh.

The tubular fastener has a tubular portion sleeved around the sleeve member, and an end plate portion transversely connected to a front end of the sleeve portion and having a cable entry hole in communication with the passage of the sleeve member. The cable entry hole is configured to allow the fiber optic cable to extend into the passage. The tubular portion has an internal thread threadedly connected to the outer thread of the sleeve member. The anti-slip portion of the sleeve member and the tubular portion cooperate with each other to clamp the rear end of the mesh.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
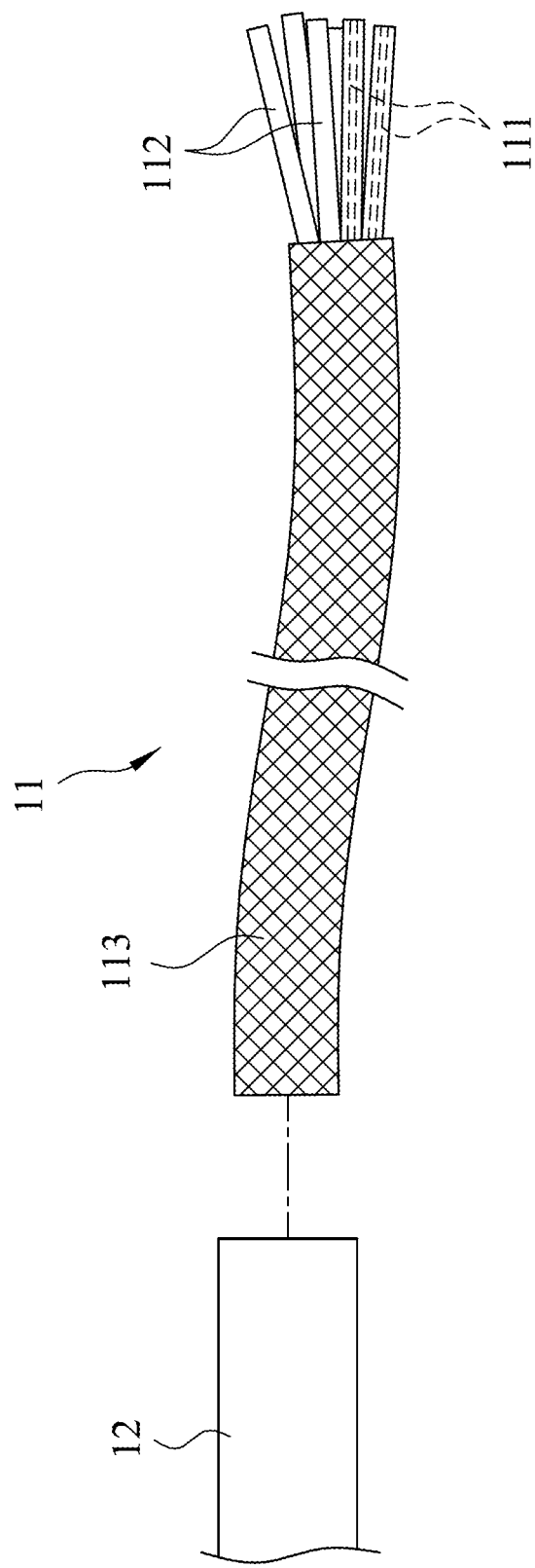
FIG. 1 is a fragmentary view, illustrating a fiber optic cable for insertion into an installation pipe.
Figure 2:
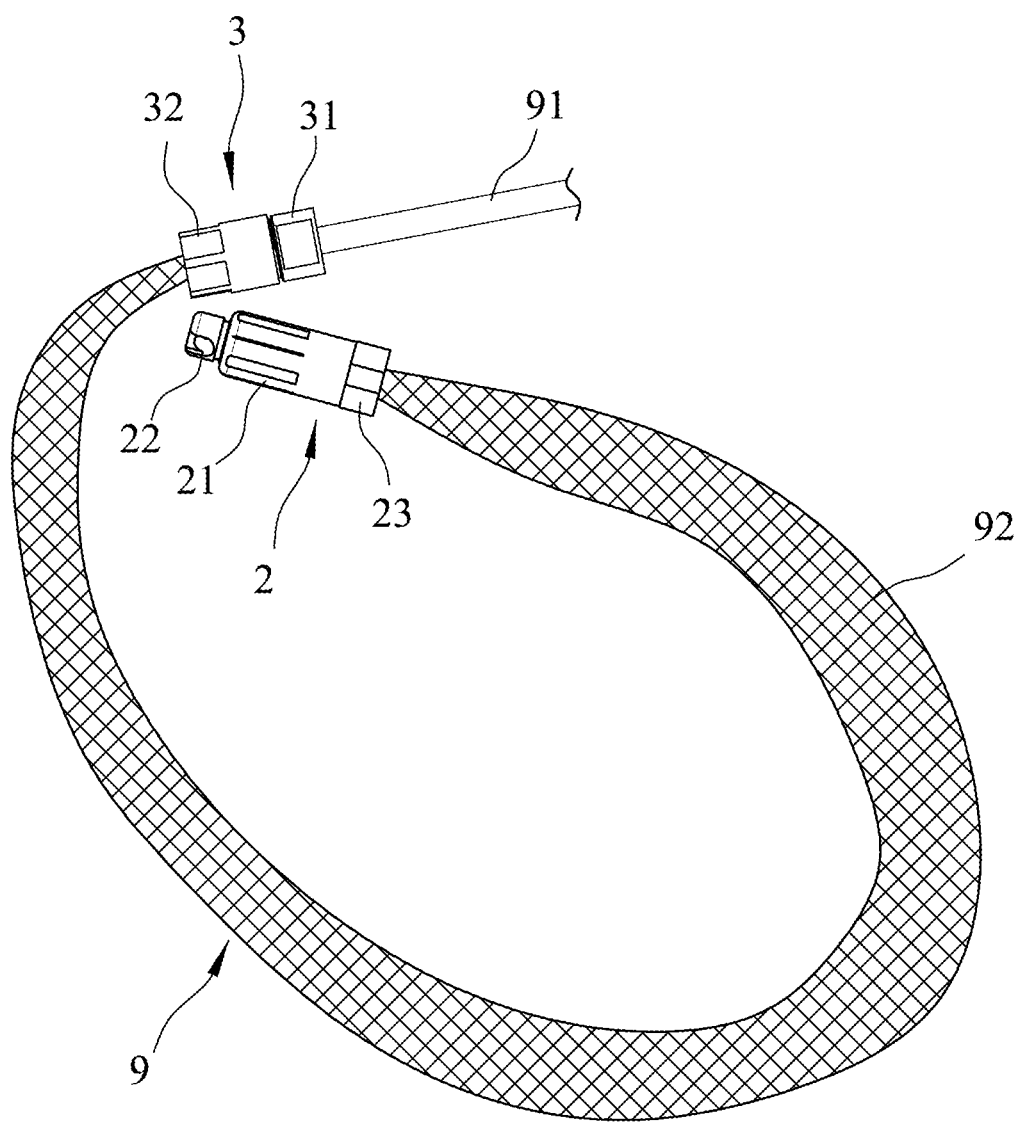
FIG. 2 illustrates a fiber optic pulling grip assembly according to an embodiment of the disclosure usable for a fiber optic cable.

Referring to FIG. 2, a fiber optic pulling grip assembly according to an embodiment of the present disclosure is suitable for a fiber optic cable 9. The fiber optic cable 9 has an optical fiber unit 91 and a mesh 92 surrounding the optical fiber unit 91. The fiber optic pulling grip assembly includes a front grip unit 2 configured to sleeve around a front end of the fiber optic cable 9 and to grip a front end of the mesh 92, and a rear grip unit 3 disposed rearward of the front grip unit 2.

Figure 3:
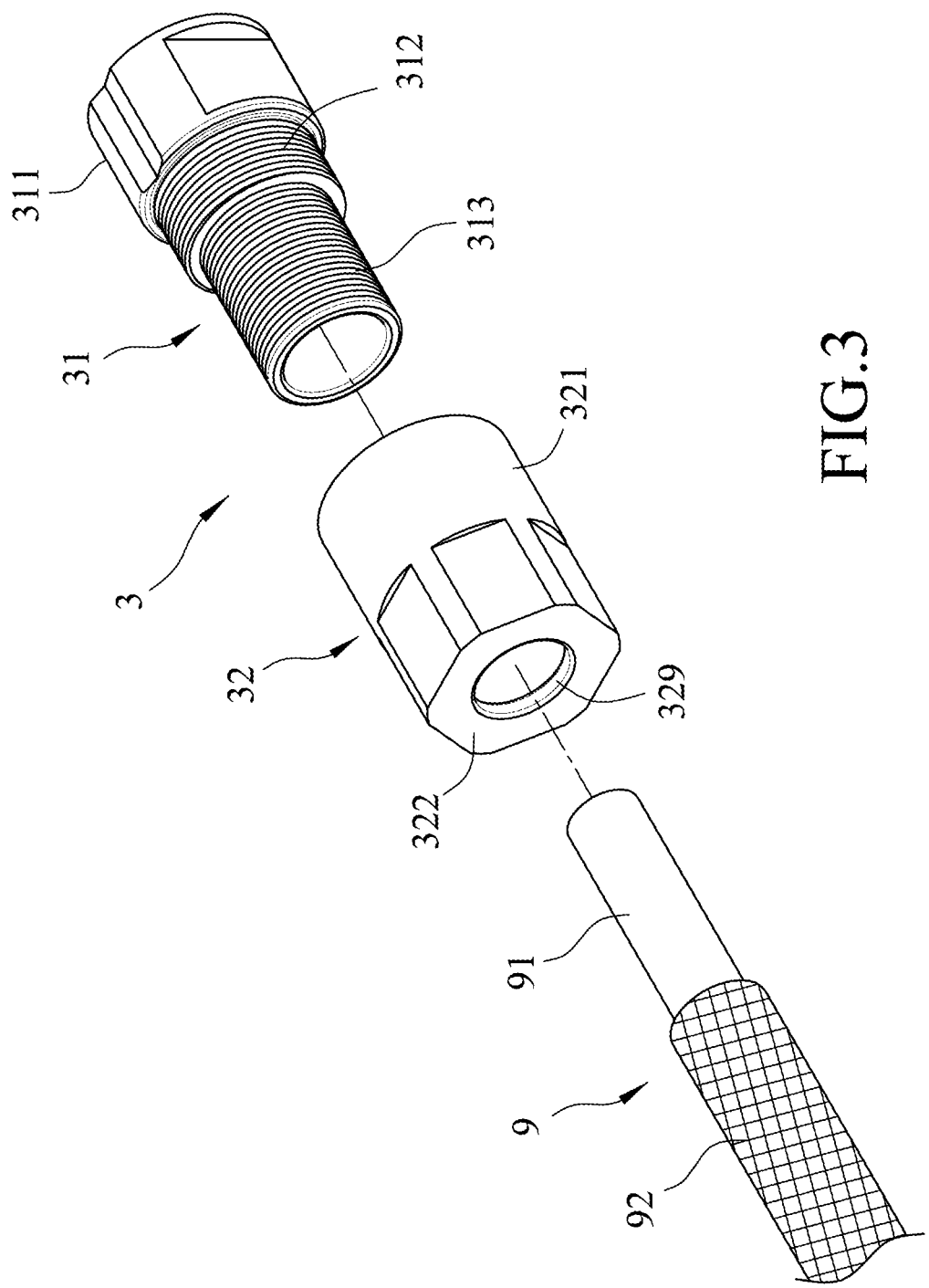
FIG. 3 is a fragmentary exploded perspective view of the embodiment, illustrating a rear grip unit of the fiber optic pulling grip assembly.
Figure 4:
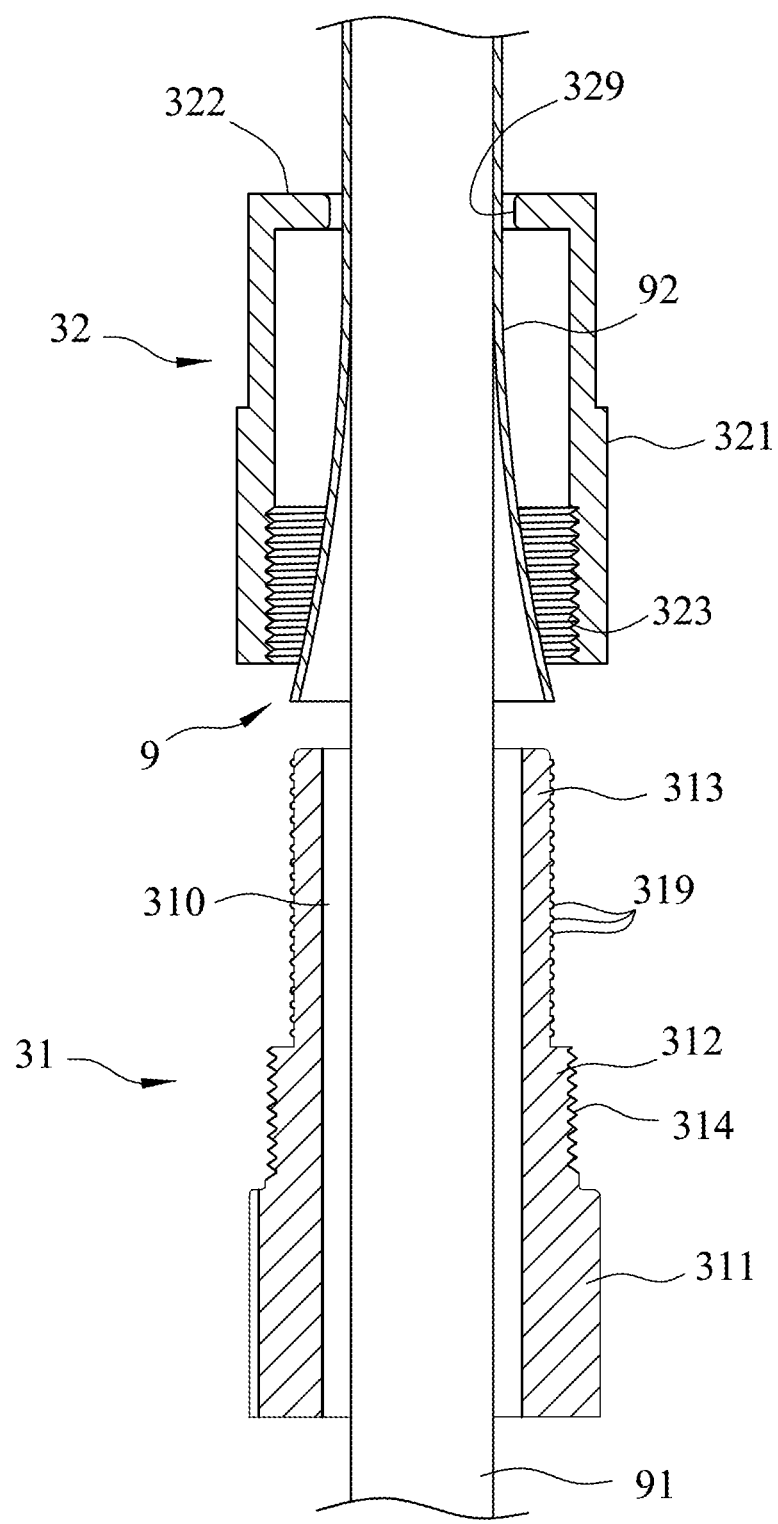
FIG. 4 is a fragmentary sectional view of the embodiment, illustrating the rear grip unit of the fiber optic pulling grip assembly in an unassembled state.

Referring to FIGS. 3 and 4, the rear grip unit 3 includes a sleeve member 31 and a tubular fastener 32.

The sleeve member 31 has a sleeve portion 311, a threaded portion 312 extending integrally and frontally from the sleeve portion 311, an anti-slip portion 313 extending integrally and frontally from the threaded portion 312, and a passage 310 extending through the sleeve, thread and anti-slip portions 311, 312, 313. The passage 310 is configured to allow insertion of the optical fiber unit 91. The threaded portion 312 is formed with an outer thread 314. The anti-sip portion 313 has an outer surface formed with a plurality of protrusions 319. The protrusions 319 are formed as rings that extend around the anti-slip portion 313 and that are spaced apart from each other along an axial direction of the sleeve member 31.

The tubular fastener 32 has a tubular portion 321 sleeved around the sleeve member 31, and an end plate portion 322 transversely connected to a front end of the tubular portion 321 and having a cable entry hole 329 in communication with the passage 310 of the sleeve member 31. The tubular portion 321 has an internal thread 323.

Figure 5:
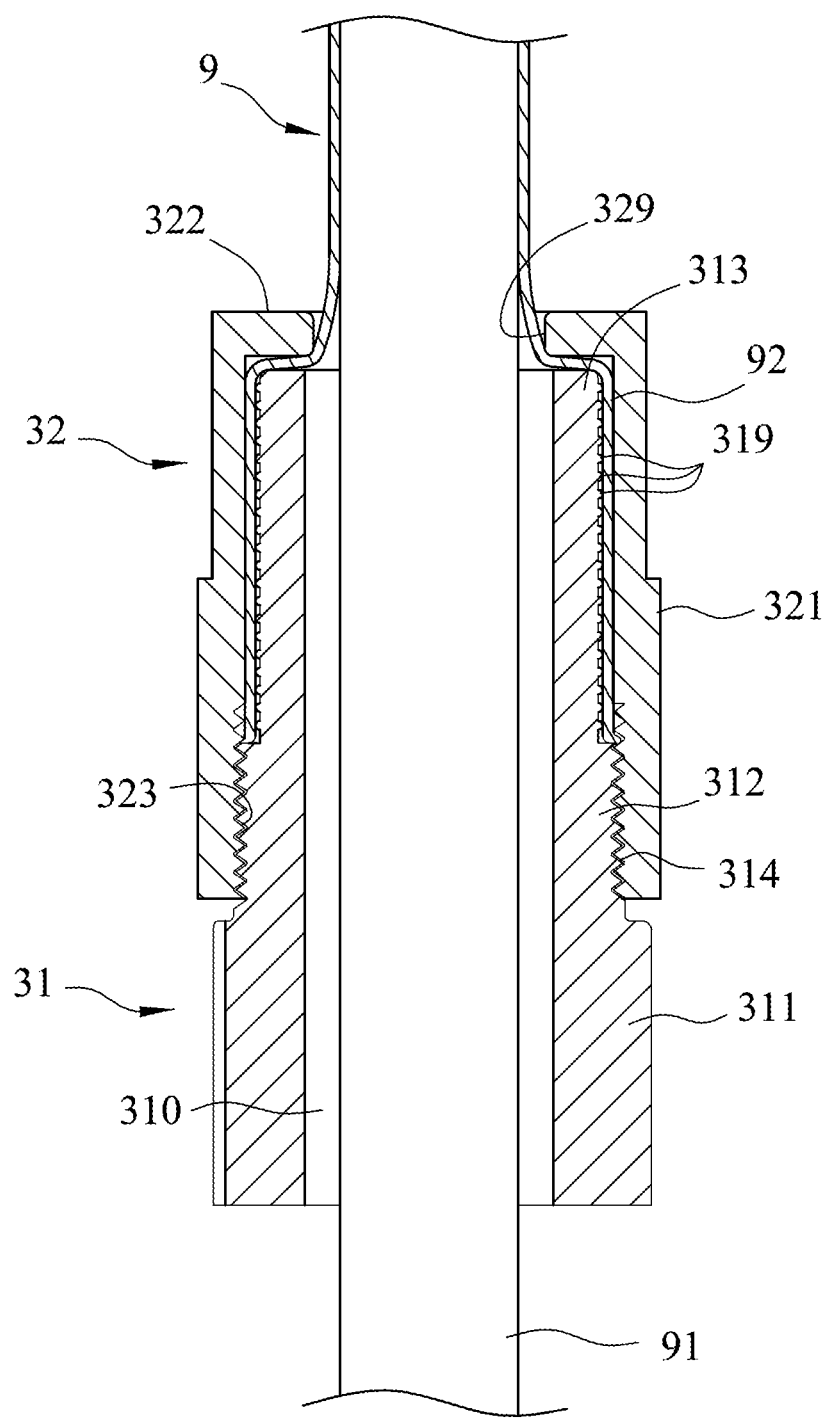
FIG. 5 is a fragmentary sectional view of the embodiment, illustrating the rear grip unit in an assembled state.

Referring to FIG. 5, in combination with FIGS. 3 and 4, to grip a rear end of the fiber optic cable 9, the fiber optic cable 9 is inserted into the passage 310 of the sleeve member 31 through the cable entry hole 329 of the tubular fastener 32. A rear end of the mesh 92 sleeves the anti-slip 313 of the sleeve member 31. When the internal thread 323 of the tubular fastener 32 is threadedly connected to the outer thread 314 of the sleeve member 31, the rear end of the mesh 92 is clamped between the outer surface of the anti-slip portion 313 and the tubular portion 321. By virtue of the protrusion 319 of the sleeve member 31 which provides an effective frictional surface, the rear end of the mesh 92 is efficiently positioned between the anti-slip portion 313 of the sleeve member 31 and the tubular portion 321.

Figure 6:
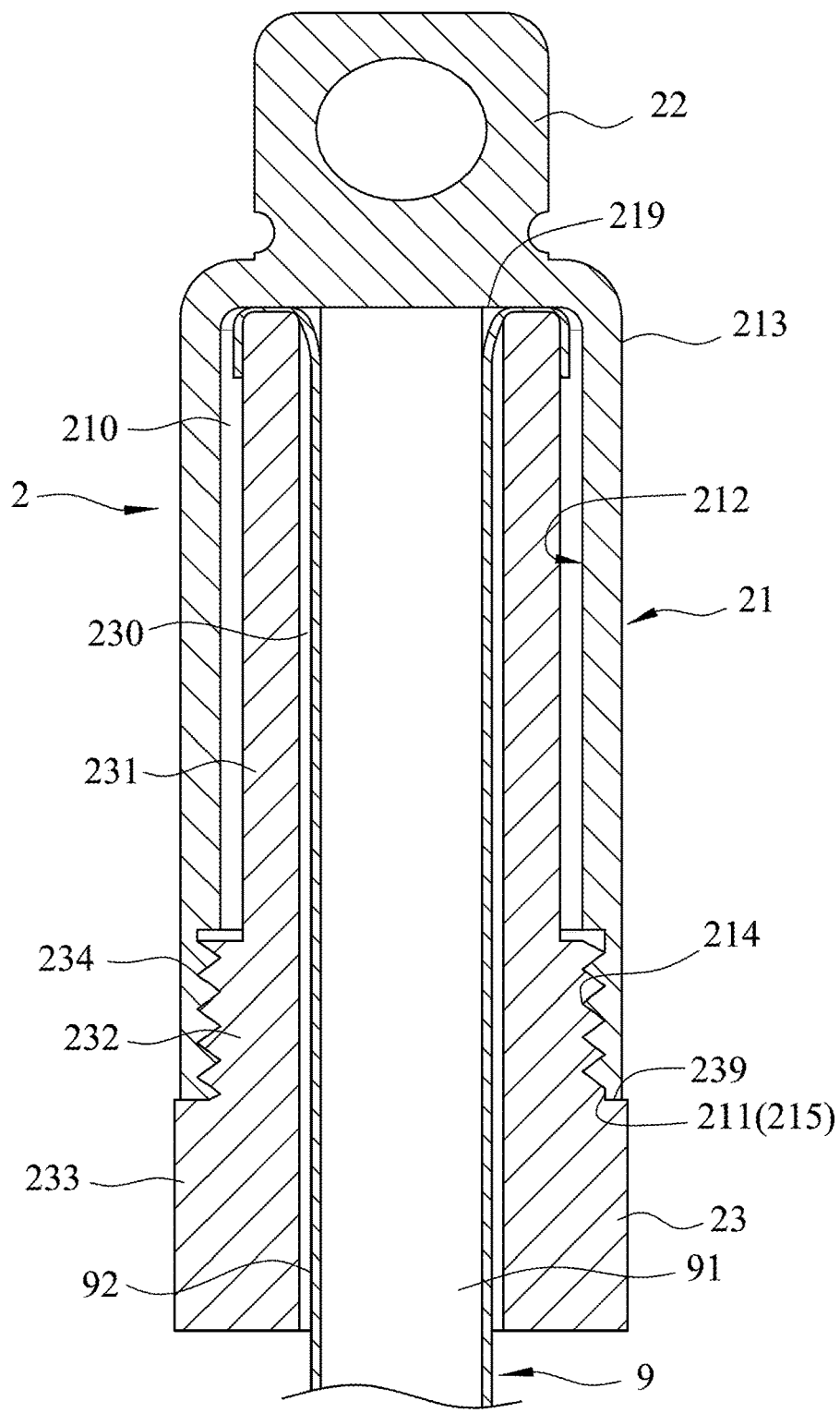
FIG. 6 is a fragmentary sectional view of the embodiment, illustrating a front grip unit of the fiber optic pulling grip assembly.

Referring to FIG. 6, in combination with FIG. 2, the front grip unit 2 includes a main body 21, a pull ring 22 and a connection tube 23. The main body 21 has a reception space 210, an inner surface 212 surrounding the reception space 210, and an outer surface 213 opposite to the inner surface 212. The reception space 210 has a rear opening 211 facing rearward. The inner surface 212 has an internal thread 214 extending frontally from the rear opening 211. The pull ring 22 is disposed frontally of and connected to the main body 21. In this embodiment, the main body 21 further has a front closed end 219 and a rear end 215. The front closed end 219 is opposite to the rear opening 211 of the reception space 210 and is connected to the pull ring 22. The rear end 215 is disposed at the rear opening 211. The connection tube 23 is threadedly connected to the main body 21 oppositely of the pull ring 22. The connection tube 23 has a narrowed portion 231, a screw portion 232 rearwardly extending from the narrowed portion 231, a widened portion 233 rearwardly extending from the screw portion 232, and a channel 230 extending through the narrowed, screw and widened portions 231, 232, 233. The screw portion 232 has an outer thread 234. The widened portion 233 is wider than an outer diameter of the screw portion 232. In addition, the connection tube 23 further has an annular shoulder face 239 surrounding and adjoining the screw portion 232 at a junction of the screw and widened portions 232, 233.

To grip a front end of the fiber optic cable 9, the front end of the fiber optic cable 9 extends through the channel 230, and the front end of the mesh 92 extends outwardly and frontally beyond the narrowed port ion 231. When the outer thread 234 of the screw portion 232 is threadedly connected to the internal thread 214 of the main body 21, the front closed end 219 of the main body 21 and the narrowed portion 231 of the connection tube 23 cooperate with each other to clamp the front end of the mesh 92. When the rear end 215 of the main body 21 abuts the annular shoulder of the connection tube 23, positioning of the front end of the mesh 92 is ensured.

Figure 7:
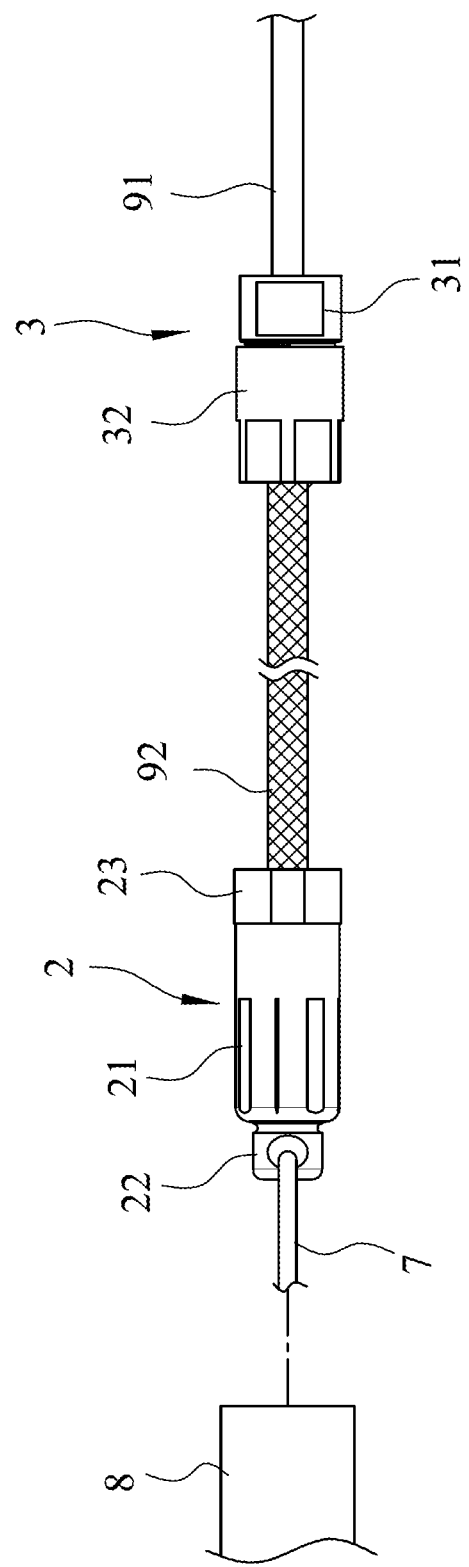
FIG. 7 illustrates that the fiber optic pulling grip assembly of the disclosure is used to pull the fiber optic cable into an installation pipe.

Referring to FIG. 7, in combination with FIGS. 5 and 6, after the front and rear grip units 2, 3 are respectively fixed to the front and rear ends of the mesh 92, the fiber optic cable 9 is allowed to be inserted into an installation pipe 8. To insert the fiber optic cable 9 into the installation pipe 8, the pull ring 22 is tied to an auxiliary string 7 which is thereafter pulled to first extend through the installation pipe 8. During the pulling of the auxiliary string 7, the fiber optic pulling grip assembly of the disclosure and the fiber optic cable 9 are pulled together with the auxiliary string 7 to extend through the installation pipe 8. During the insertion of the fiber optic cable 9 into the installation pipe 8, because the fiber optic pulling grip assembly of the disclosure firmly grips the front and rear ends of the mesh 92, the front and rear ends of the mesh 92 are prevented from displacing and sliding with respect to the optical fiber unit 91. Therefore, efficient protection of the optical fiber unit 9 by the mesh 92 is ensured. During the insertion of the fiber optic cable unit 9 into the installation pipe 8, destruction caused to the fiber optic cable 91 due to abrasion between the optical fiber cable 91 and the installation pipe 8 can be assuredly avoided.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A fiber optic pulling grip assembly for a fiber optic cable that has an optical fiber unit and a mesh surrounding the optical fiber unit, comprising:

a front grip unit configured to sleeve around a front end of the fiber optic cable and to grip a front end of the mesh; and a rear grip unit disposed rearward of said front grip unit and including a sleeve member having a sleeve portion, a threaded portion extending integrally and frontally from said sleeve portion, an anti-slip portion extending integrally and frontally from said threaded portion, and a passage extending through said sleeve, threaded and anti-slip portions, said passage being configured to allow insertion of the optical fiber unit, said threaded portion being formed with an outer thread, said anti-slip portion being configured to be sleeved by a rear end of the mesh, said anti-sip portion having an outer surface formed with a plurality of protrusions configured to increase friction between said outer surface and the mesh, and a tubular fastener having a tubular portion sleeved around said sleeve member, and an end plate portion transversely connected to a front end of said tubular portion and having a cable entry hole in communication with said passage of said sleeve member, said cable entry hole being configured to allow the fiber optic cable to extend into said passage, said tubular portion having an internal thread threadedly connected to said outer thread of said sleeve member, said anti-slip portion of said sleeve member and said tubular portion cooperating with each other to clamp the rear end of the mesh.

2. The fiber optic pulling grip assembly as claimed in claim 1, wherein said protrusions are formed as rings that extend around said anti-slip portion and that are spaced apart from each other along an axial direction of said sleeve member.

3. The fiber optic pulling grip assembly as claimed in claim 1, wherein said front grip unit includes:
   a main body having a reception space, an inner surface surrounding said reception space, and an outer surface opposite to said inner surface, said reception space having a rear opening facing rearward, said inner surface having an internal thread extending frontally from said rear opening;
   a pull ring disposed frontally of and connected to said main body; and
   a connection tube threadedly connected to said main body oppositely of said pull ring, said connection tube having a narrowed portion, a screw portion rearwardly extending from said narrowed portion, a widened portion rearwardly extending from said screw portion, and a channel extending through said narrowed, screw and widened portions, said screw portion having an outer thread threadedly connected to said internal thread of said main body, said widened portion being wider than an outer diameter of said screw portion, said channel being configured to allow the fiber optic cable to extend therethrough, said narrowed portion and said main body cooperating with each other to clamp the front end of the mesh.

4. The fiber optic pulling grip assembly as claimed in claim 3, wherein said connection tube further has an annular shoulder face surrounding and adjoining said screw portion at a junction of said screw and widened portions, said main body further having a rear end disposed at said rear opening and abutting said annular shoulder surface.

5. The fiber optic pulling grip assembly as claimed in claim 3, wherein said main body further has a front closed end that is opposite to said rear opening of said reception space and that is connected to said pull ring, said front closed end of said main body and said narrowed portion of said connection tube cooperating with each other to clamp the front end of the mesh.

* * * * *